(12) United States Patent
Clayton

(10) Patent No.: US 7,374,248 B1
(45) Date of Patent: May 20, 2008

(54) RIM COVERING DEVICE

(76) Inventor: Anthony J. Clayton, 10620 A Antioch Rd., Lauderdale, MS (US) 39335

( * ) Notice: Subject to any disclaimer, the term of this patent is extended or adjusted under 35 U.S.C. 154(b) by 109 days.

(21) Appl. No.: 11/363,433

(22) Filed: Feb. 28, 2006

(51) Int. Cl.
*B60B 7/06* (2006.01)

(52) U.S. Cl. .............................. 301/37.103; 301/37.104

(58) Field of Classification Search .......... 301/37.102, 301/37.103, 37.104, 37.31, 37.34, 37.35, 301/37.36, 37.42
See application file for complete search history.

(56) References Cited

U.S. PATENT DOCUMENTS

| | | | | |
|---|---|---|---|---|
| 2,455,151 A | * | 11/1948 | Wood | 301/37.34 |
| 4,784,440 A | * | 11/1988 | Fair | 301/37.103 |
| 4,811,991 A | * | 3/1989 | Moreno et al. | 301/37.103 |
| 4,874,206 A | * | 10/1989 | Sampson | 301/37.103 |
| 4,889,394 A | * | 12/1989 | Ruspa | 301/37.36 |
| 5,435,630 A | | 7/1995 | Tucker | |
| 5,531,508 A | * | 7/1996 | Bell, III | 301/37.23 |
| D379,172 S | | 5/1997 | Hale | |
| 5,791,741 A | * | 8/1998 | Sheu | 301/37.34 |
| 6,227,623 B1 | * | 5/2001 | Bellow | 301/37.42 |
| 6,412,878 B1 | | 7/2002 | Bell et al. | |
| 6,450,582 B2 | * | 9/2002 | Ichikawa et al. | 301/37.36 |
| 6,585,329 B2 | | 7/2003 | Crump | |
| 6,672,677 B1 | * | 1/2004 | Smith | 301/37.103 |
| 6,692,085 B1 | | 2/2004 | Threadgill | |
| 2003/0137187 A1 | * | 7/2003 | Williams | 301/37.103 |

* cited by examiner

*Primary Examiner*—Russell D Stormer

(57) ABSTRACT

A rim covering device for inhibiting contact of a tire cleaning spray with a rim when a tire is being cleaned includes a cover being positionable over a rim to inhibit a tire cleaning spray from being sprayed on the rim. An absorbent band is coupled to the cover. The absorbent band absorbs the tire cleaning spray that is over sprayed onto the cover. A handle is coupled to the cover opposite the forward edge. The handle is gripped to facilitate maneuvering of the cover over the rim.

12 Claims, 4 Drawing Sheets

RIM COVERING DEVICE

BACKGROUND OF THE INVENTION

1. Field of the Invention

The present invention relates to tire rim protectors and more particularly pertains to a new tire rim protector for inhibiting contact of a tire cleaning spray with a rim and hubcap when a tire is being cleaned.

2. Description of the Prior Art

The use of tire rim protectors is known in the prior art. The prior art typically teaches tire rim protectors that have a smooth outer surface which will allow tire cleaning spray to run down the outer surface and possibly come into contact with a rim when the tire rim protectors are removed from the rim.

While these devices fulfill their respective, particular objectives and requirements, the need remains for a device that has certain improved features that allows for over sprayed tire cleaning spray to be absorbed to inhibit run off on to a rim when the device is removed from the rim.

SUMMARY OF THE INVENTION

The present invention meets the needs presented above by generally comprising a cover being positionable over a rim to inhibit a tire cleaning spray from being sprayed on the rim. An absorbent band is coupled to the cover. The absorbent band absorbs the tire cleaning spray that is over sprayed onto the cover. A handle is coupled to the cover opposite the forward edge. The handle is gripped to facilitate maneuvering of the cover over the rim.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
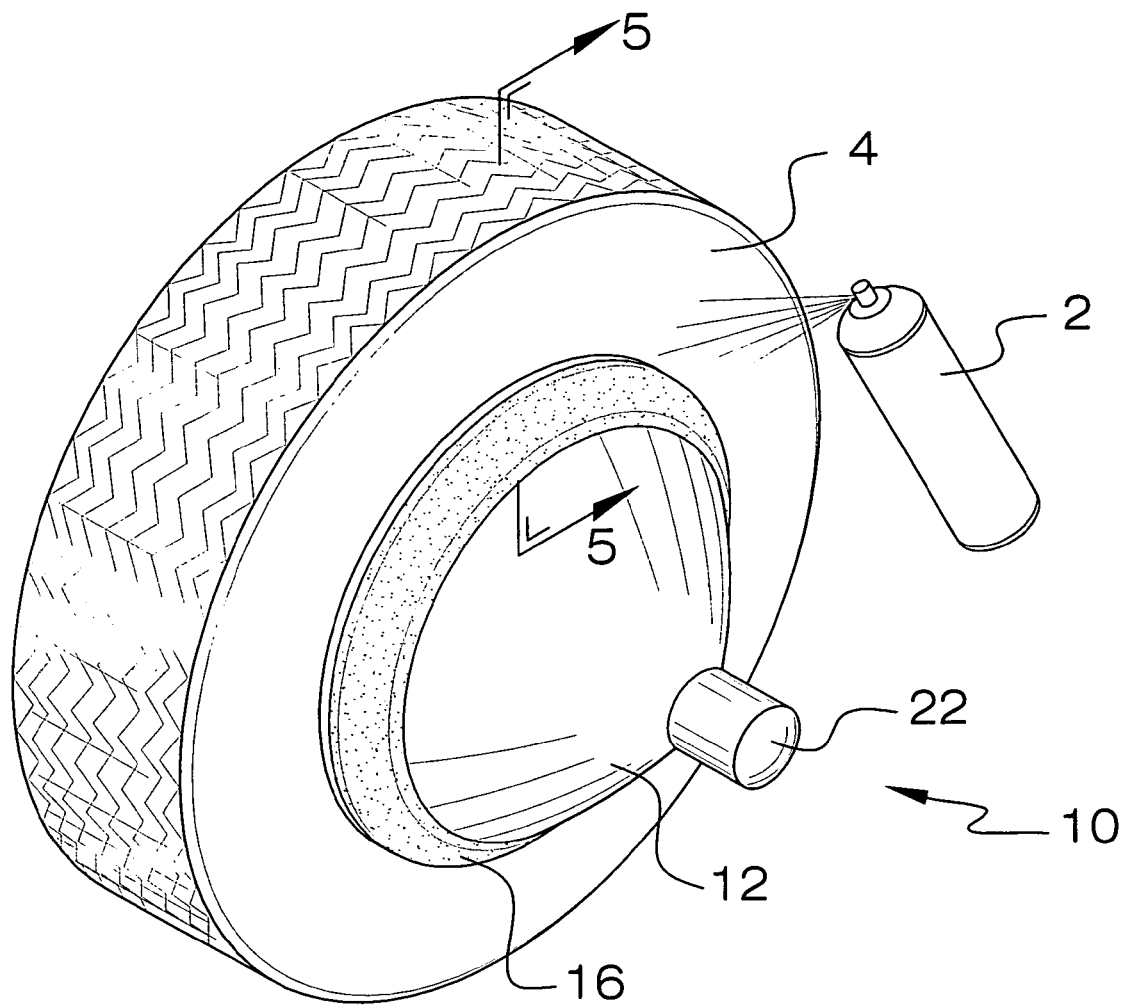
FIG. 1 is a perspective view of a rim covering device according to the present invention shown in use.
Figure 2:
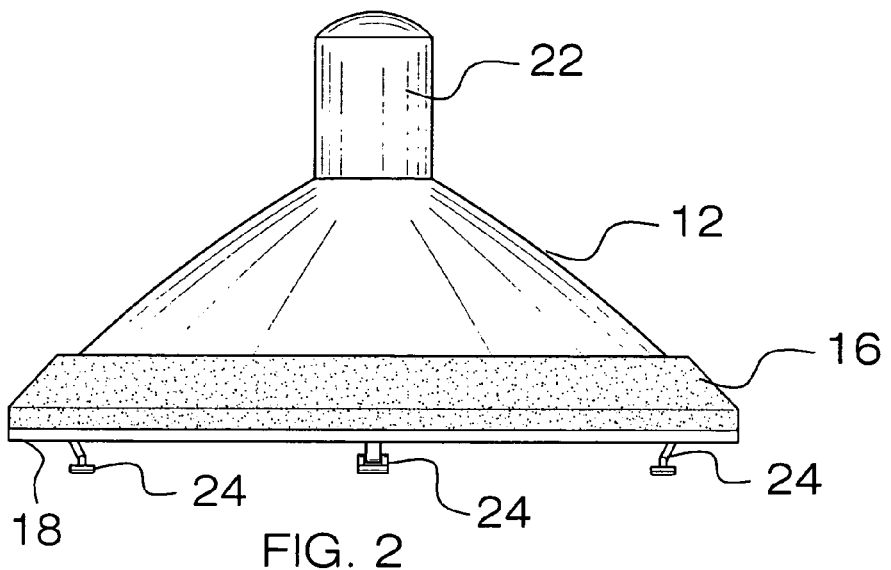
FIG. 2 is a top view of the present invention.
Figure 3:
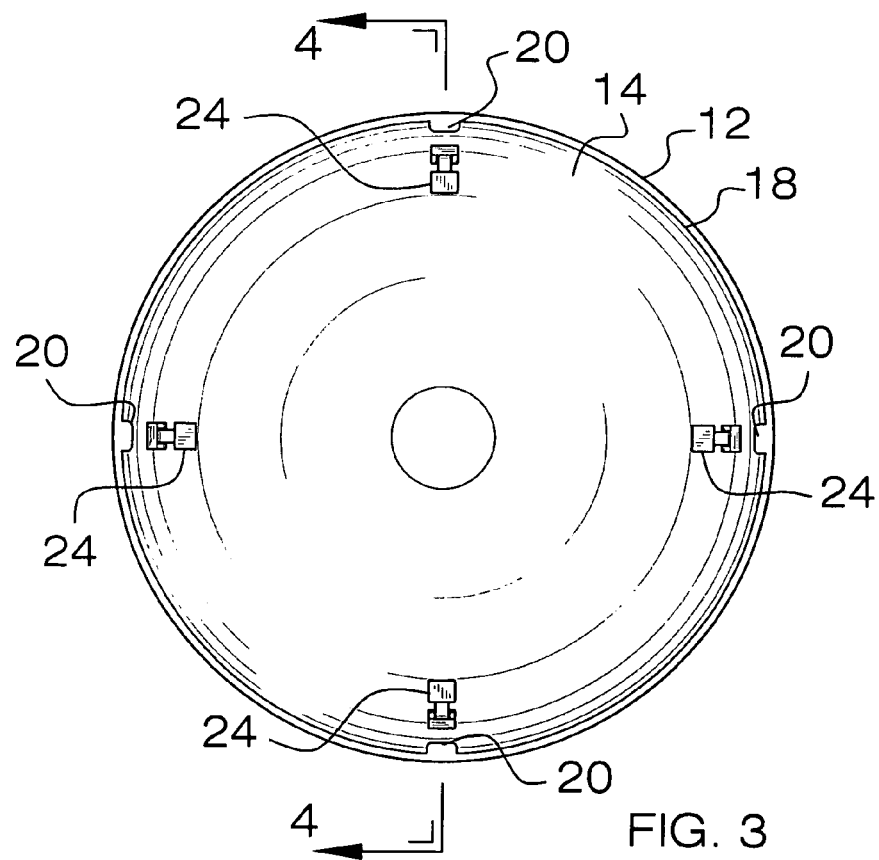
FIG. 3 is a front view of the present invention.
Figure 4:
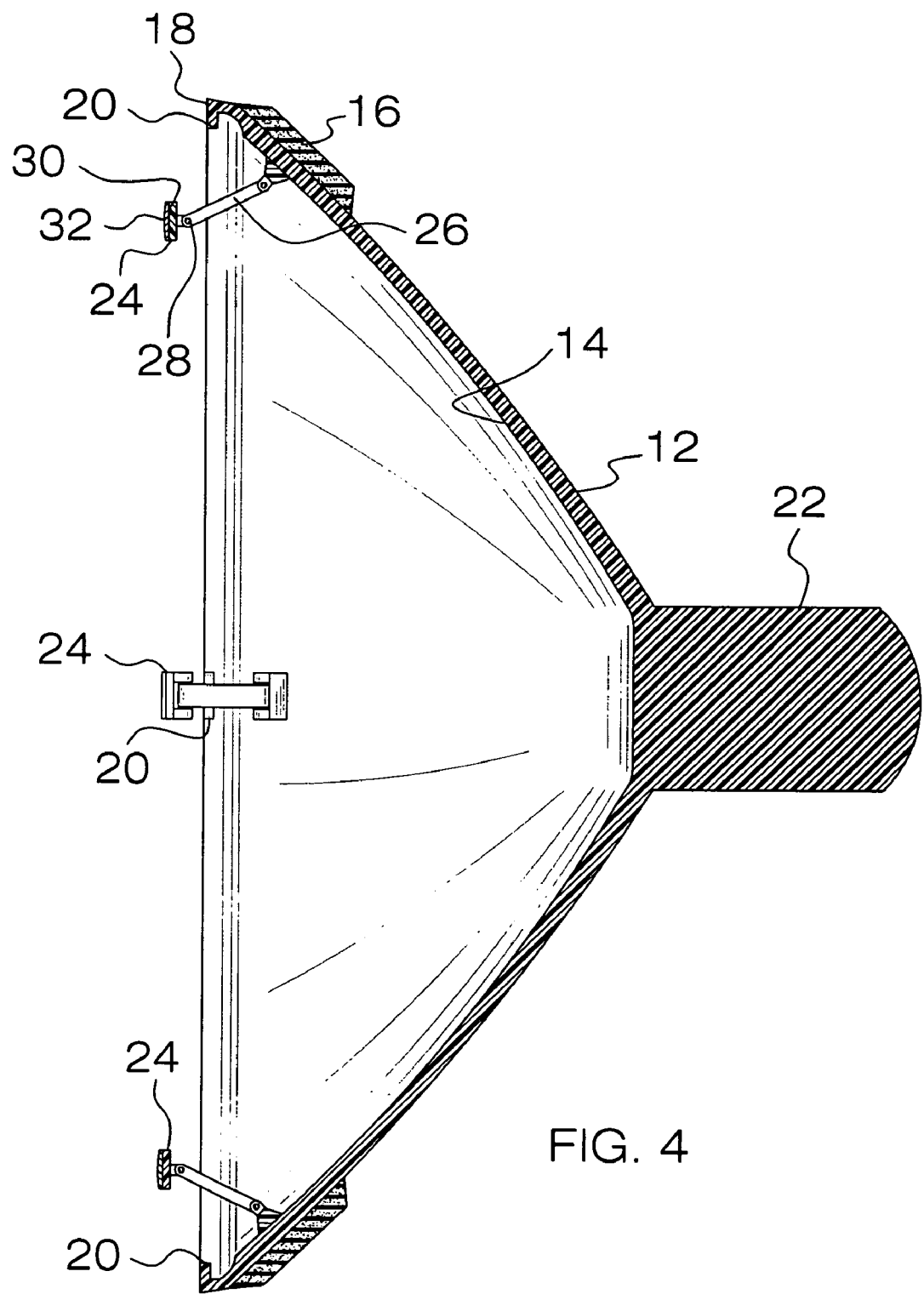
FIG. 4 is a cross-sectional view of the present invention taken along line 4-4 of FIG. 3.
Figure 5:
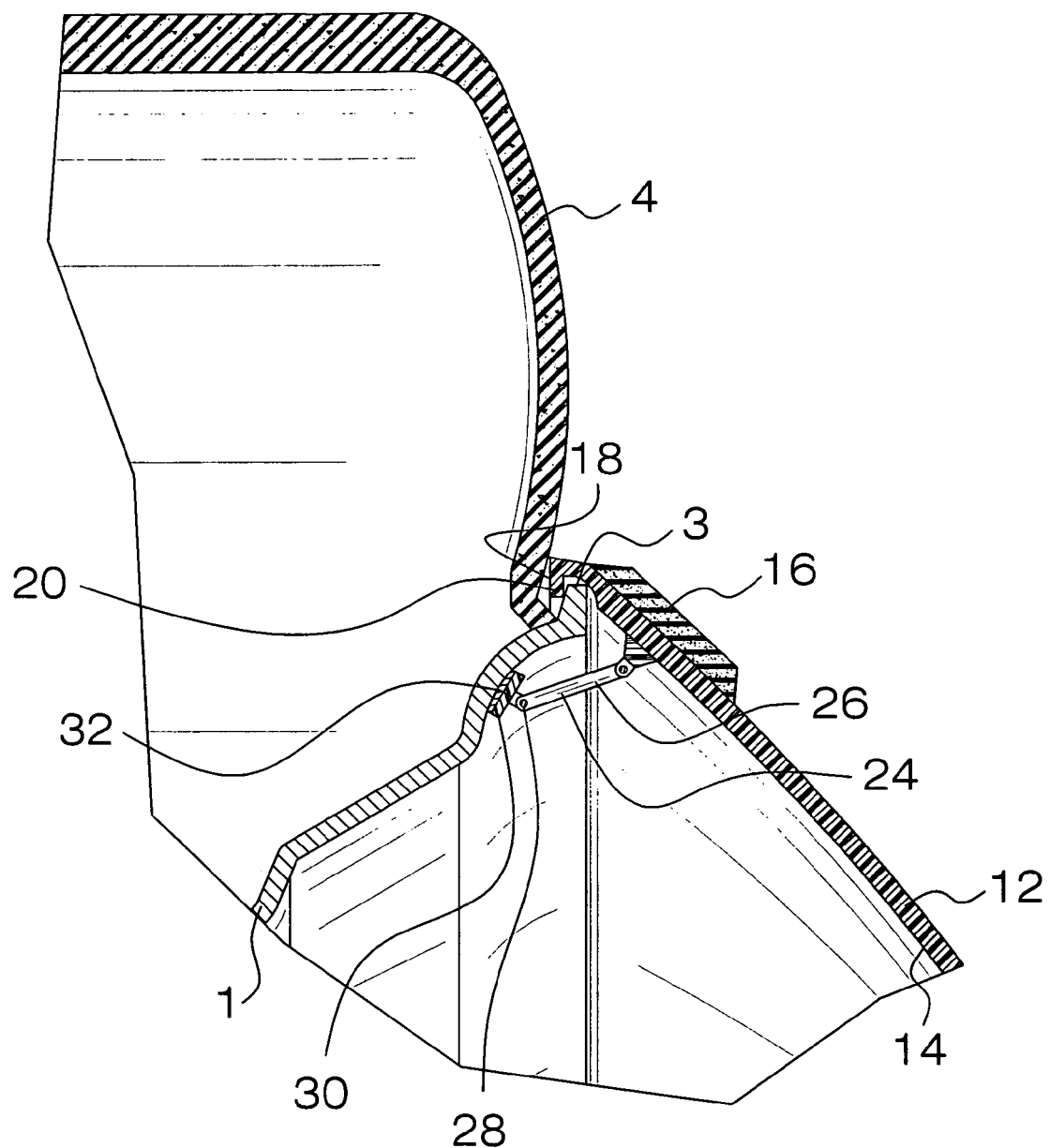
FIG. 5 is an enlarged cross-sectional view of the present invention taken along line 5-5 of FIG. 1.

With reference now to the drawings, and in particular to FIGS. 1 through 5 thereof, a new tire rim protector embodying the principles and concepts of the present invention and generally designated by the reference numeral 10 will be described.

As best illustrated in FIGS. 1 through 5, the rim 1 covering device 10 generally comprises a cover 12 being positionable over a rim 1 to inhibit a tire cleaning spray 2 from being sprayed on the rim 1. The cover 12 has a substantially frusto-conical shape. An interior face 14 of the cover 12 is substantially concave to receive a portion of the rim 1. An absorbent band 16 is coupled to the cover 12. The absorbent band 16 absorbs the tire cleaning spray 2 that is over sprayed onto the cover 12. The absorbent band 16 is coupled to the cover 12 adjacent a forward edge 18 of the cover 12 and extends around a circumference of the cover 12.

Each of a plurality of tabs 20 is integrally coupled to the cover 12 adjacent the forward edge 18 of the cover 12. Each of the tabs 20 is insertable between a lip 3 of the rim 1 and a tire 4 to selectively secure the cover 12 to the rim 1. A handle 22 is coupled to the cover 12 opposite the forward edge 18. The handle 22 is gripped to facilitate maneuvering of the cover 12 over the rim 1.

Each of a plurality of magnetic couplers 24 is coupled to the interior face 14 of the cover 12. Each of the magnetic couplers 24 is magnetically coupled to the rim 1 to facilitate securing of the cover 12 to the rim 1. Each of the magnetic couplers 24 is positioned in a spaced relationship from the forward edge 18 of the cover 12. Each of the magnetic couplers 24 includes an arm 26 hingedly coupled to the interior face 14 of the cover 12. A distal end 28 of the arm 26 opposite the interior face 14 of the cover 12 is extendable beyond and through a plane of the forward edge 18 of the cover 12. An end portion 30 is hingedly coupled to the distal end 28 of the arm 26. A magnet 32 is coupled to the end portion 30 opposite the arm 26. The magnet 32 magnetically engages the rim 1 to secure the arm 26 and the cover 12 to the rim 1.

In use, at least one of the tabs 20 is inserted between the lip 3 and the tire 4 so that the cover 12 is secured to the rim 1 and is positioned over the rim 1. When the rims 1 are made of steel, the magnetic couplers 24 can be extended beyond the forward edge 18 to magnetically engage the rim 1 and secure the cover 12 to the rim 1. With the cover 12 in place over the rim 1 the tire cleaning spray 2 can be sprayed onto the tire 4 with the over spray being absorbed by the absorbent pad while the cover 12 inhibits the tire cleaning spray 2 from getting on the rim 1.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification and intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rim covering device to inhibit contact between a rim and a tire cleaning spray, said device comprising:

a cover being positionable over the rim to inhibit the tire cleaning spray from being sprayed on the rim;

an absorbent band being coupled to said cover, said absorbent band absorbing the tire cleaning spray that is over sprayed onto said cover;

a handle being coupled to said cover opposite said forward edge, said handle being gripped to facilitate maneuvering of said cover over the rim a plurality of tabs, each of said tabs being integrally coupled to said cover adjacent a forward edge of said cover, each of said tabs being insertable between a lip of the rim and the tire to selectively secure said cover to the rim; and a plurality of magnetic couplers, each of said magnetic couplers being coupled to an interior face of said cover, each of said magnetic couplers being magnetically coupled to the rim to facilitate securing of said cover to the rim, each of said magnetic couplers being positioned in a spaced relationship from said forward edge of said cover, each of said magnetic couplers including an arm being hingedly coupled to said interior face of said cover, a distal end of said arm opposite said interior face of said cover being extendable beyond and through a plane of said forward edge of said cover.

2. The device according to claim 1, wherein said cover has a substantially frusto-conical shape.

3. The device according to claim 1, wherein an interior face of said cover is substantially concave to receive a portion of the rim.

4. The device according to claim 1, wherein said absorbed band is coupled to said cover adjacent a forward edge of said cover and extending around a circumference of said cover.

5. The device according to claim 1, wherein each of said magnetic couplers includes an end portion being hingedly coupled to said distal end of said arm, a magnet being coupled to said end portion opposite said arm, said magnet magnetically engaging the rim to secure said arm and said cover to the rim.

6. A rim covering device to inhibit contact between a rim and a tire cleaning spray, said device comprising:

a cover being positionable over the rim to inhibit the tire cleaning spray from being sprayed on the rim, said cover having a substantially frusto-conical shape, an interior face of said cover being substantially concave to receive a portion of the rim;

an absorbent band being coupled to said cover, said absorbent band absorbing the tire cleaning spray that is over sprayed onto said cover, said absorbent band being coupled to said cover adjacent a forward edge of said cover and extending around a circumference of said cover;

a plurality of tabs, each of said tabs being integrally coupled to said cover adjacent said forward edge of said cover, each of said tabs being insertable between a lip of the rim and the tire to selectively secure said cover to the rim;

a plurality of magnetic couplers, each of said magnetic couplers being coupled to said interior face of said cover, each of said magnetic couplers being magnetically coupled to the rim to facilitate securing of said cover to the rim, each of said magnetic couplers being positioned in a spaced relationship from said forward edge of said cover, each of said magnetic couplers comprising;

an arm being hingedly coupled to said interior face of said cover, a distal end of said arm opposite said interior face of said cover being extendable beyond and through a plane of said forward edge of said cover;

an end portion being hingedly coupled to said distal end of said arm;

a magnet being coupled to said end portion opposite said arm, said magnet magnetically engaging the rim to secure said arm and said cover to the rim; and a handle being coupled to said cover opposite said forward edge, said handle being gripped to facilitate maneuvering of said cover over the rim.

7. A rim covering device to inhibit contact between a rim and a tire cleaning spray, said device comprising:

a cover being positionable over the rim to inhibit the tire cleaning spray from being sprayed on the rim;

an absorbent band being coupled to said cover, said absorbent band absorbing the tire cleaning spray that is over sprayed onto said cover;

a plurality of magnetic couplers, each of said magnetic couplers being coupled to an interior face of said cover, each of said magnetic couplers being magnetically coupled to the rim to facilitate securing of said cover to the rim, each of said magnetic couplers being positioned in a spaced relationship from a forward edge of said cover, each of said magnetic couplers including an arm being hingedly coupled to said interior face of said cover, a distal end of said arm opposite said interior face of said cover being extendable beyond and through a plane of said forward edge of said cover; and a handle being coupled to said cover opposite said forward edge, said handle being gripped to facilitate maneuvering of said cover over the rim.

8. The device according to claim 7, wherein said cover has a substantially frusto-conical shape.

9. The device according to claim 7, wherein an interior face of said cover is substantially concave to receive a portion of the rim.

10. The device according to claim 7, wherein said absorbent band is coupled to said cover adjacent a forward edge of said cover and extending around a circumference of said cover.

11. The device according to claim 7, further comprising a plurality of tabs, each of said tabs being integrally coupled to said cover adjacent a forward edge of said cover, each of said tabs being insertable between a lip of the rim and the tire to selectively secure said cover to the rim.

12. The device according to claim 7, wherein each of said magnetic couplers includes an end portion being hingedly coupled to said distal end of said arm, a magnet being coupled to said end portion opposite said arm, said magnet magnetically engaging the rim to secure said arm and said cover to the rim.

\* \* \* \* \*